United States Patent [19]
Becker

[11] Patent Number: 5,861,891
[45] Date of Patent: Jan. 19, 1999

[54] METHOD, SYSTEM, AND COMPUTER PROGRAM FOR VISUALLY APPROXIMATING SCATTERED DATA

[75] Inventor: Barry Glenn Becker, Mountain View, Calif.

[73] Assignee: Silicon Graphics, Inc., Mountain View, Calif.

[21] Appl. No.: 782,809

[22] Filed: Jan. 13, 1997

[51] Int. Cl.$^6$ .................................................. G06F 15/00
[52] U.S. Cl. ............................................................. 345/433
[58] Field of Search .................................. 345/443, 440, 345/441, 470, 177, 118, 121

[56] References Cited

U.S. PATENT DOCUMENTS

| | | | |
|---|---|---|---|
| 3,816,726 | 6/1974 | Sutherland et al. ...................... | 235/152 |
| 4,868,771 | 9/1989 | Quick et al. ............................. | 364/518 |
| 4,928,247 | 5/1990 | Doyle et al. ............................. | 364/518 |
| 4,994,247 | 2/1991 | Usami et al. ............................. | 364/522 |
| 5,043,920 | 8/1991 | Malm et al. .............................. | 364/521 |
| 5,072,395 | 12/1991 | Bliss et al. .............................. | 364/443 |
| 5,150,457 | 9/1992 | Behm et al. ............................. | 395/120 |
| 5,164,904 | 11/1992 | Sumner ................................... | 364/436 |
| 5,282,262 | 1/1994 | Kurashige ............................... | 395/126 |
| 5,295,243 | 3/1994 | Robertson et al. ...................... | 395/160 |
| 5,307,456 | 4/1994 | MacKay .................................. | 395/154 |
| 5,459,829 | 10/1995 | Doi et al. ................................. | 395/152 |
| 5,528,735 | 6/1996 | Strasnick et al. ........................ | 395/127 |
| 5,555,354 | 9/1996 | Strasnick et al. ........................ | 395/127 |
| 5,732,230 | 3/1998 | Cullen et al. ............................ | 395/339 |

OTHER PUBLICATIONS

Aha, D.W. et al., "Instance–Based Learning Algorithms," *Machine Learning*, vol. 6, No. 1, pp. 37–66 (Jan. 1991).

Almuallim, H. and Dietterich, T.G.,"Learning Boolean Concepts in the Presence of Many Irrelevant Features, " *Artificial Intelligence*, vol. 69, No. 1–2, pp. 279–305 (Sep. 1994).

"Angoss Software Announces Knowledge Studio Data Mining Solution," http://www.pathfinder.com/@@xIEkO-gYAVjbJZjKM/money/latest/press/PW/19970ct27/92. Angoss Software Corporation, pp. 1–2, Oct. 1997.

"Angoss Software's KnowledgeSeeker(TM) Compatible with SAS Institute," http://www.newswire.ca/releases/September1997/18/c3915.html, pp. 1–2, Canada Newswire, Sep. 1997.

(List continued on next page.)

*Primary Examiner*—Phu K. Nguyen
*Attorney, Agent, or Firm*—Sterne, Kessler, Goldstein & Fox P.L.L.C.

[57] ABSTRACT

A method, system, and computer program product are provided for visually approximating a scatter plot. Bins of scattered data points are formed. Each axis of a scatter plot is discretized according to a binning resolution. Bin positions along each discretized scatter plot axis are determined from the bin numbers. The bins, which represent a cloud of scattered data points, are volume rendered as splats. The opacity of each splat is a function of the number (count) of data points in a corresponding bin. In one example, the opacity of a splat is determined by the following equation:

$$\text{opacity} = 1 - \exp^{(-u * count)},$$

where count is the number of scattered data points in a corresponding bin, u is a global scale factor which can be varied by a slider, and exp is an exponential function. The color of the splat represents a data attribute associated with the data points in a corresponding bin. For example, the color of the splat is a function of the average value of an external data attribute associated with the scattered data points. Splats are rendered in a sorted back to front (or front to back) order. An opaque dragger object permits a user to select different regions inside a splat plot. Arbitrarily large numbers of scattered data points can be rendered quickly. Speed depends upon binning resolution not the number of data points.

26 Claims, 7 Drawing Sheets

OTHER PUBLICATIONS

Breiman et al., *Classification and Regression Trees*, Wadsworth International Group, entire book (1984).

Cestnik, B., "Estimating Probabilities: A Crucial Task in Machine Learning," *Proceedings of the 9th European Conference on Artificial Intelligence*, pp. 147–149 (Aug. 1990).

"Companies in Data Mining and Knowledge Discovery," http://kdnuggets.com/companies.html, pp. 1–4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book, 1991.

Dasarathy, B.V., "Nearest Neighbor (NN) Norms: (NN) Patterns Classificaion Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classification and Scene Analysis*, Wiley, entire book, (1973).

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Friedman, J. H. et al., "Lazy Decision Trees," *Proceedings of the Thirteenth National Conference on Artificial Intelligence*, AAAI Press and the MIT Press, vol. 1, pp. 717–724 (1996).

Good, I.J., *The Estimation of Probabilities: An Essay on Modern Bayesian Methods*, pp. xi–xii, MIT Press, pp. 1–79, (1965).

"IBM Digs Deep for Data Mining 'Gold', " http://www.software.ibm.com/data/intellimine/factsheet.html, pp. 1–8, IBM Corporation, Copyright 1997.

"KD Mine: Data Mining and Knowledge Discovery," http://kdnuggets.com/index_kdm.html. p. 1, Knowledge Discovery Nuggets, Copyright 1997, Last updated: Oct. 31, 1997.

Kittler, J., "Feature Selection and Extraction," *Handbook of Pattern Recognition and Image Processing*. Chapter 3, pp. 59–83, Academic Press, Inc., 1986.

Knuth, A., *The Art of Computer Programming*, Addison–Wesley, vol. 2, pp. 506–550 (1973).

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R., "A Study of Cross–Validation and Bootstrap for Accuracy Estimation and Model Selection," *Proceedings of the 14th International Joint Conference on Artifical Intelligence*, Stanford University, 1995.

Kohavi, R. and John, G., "Wrappers for Feature Subset Selection," http://robotics.stanford.edu/~{ronnyk,gjohn}, May 20, 1997.

Kohavi, R. And Li, C., "Oblivious Decision Trees, Graphs, and Top–Down Pruning," *Proceedings of the 14th International Joint Conference on Artificial Intelligence*, Chriss S. Mellish (Ed.), Morgan Kaufmann Pulishers, Inc., pp. 1071–1077 (1995).

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192–197 (Aug. 1995).

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Induction of Selective Bayesian Classifiers," *Proceedings of the Tenth Conference on Uncertainty in Artificial Intelligence*, Morgan Kaufmann Publishers, Inc., pp. 399–406 (Jul. 1994).

Langley, P. and Sage, S., "Oblivious Decision Trees and Abstract Cases," *Working Notes of the AAAI–94 Workshop on Case–Based Reasoning*, AAAI Press, pp. 113–117 (1994).

Langley, P., et al., "An Analysis of Bayesian Classifiers," *Proceedings of the Tenth National Conference on Artificial Intellilgence*, pp. 223–228 (Jul. 1992).

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Michie, et al., *Machine Learning, Neural and Statistical Classification*, Ellis Norwood United, entire book, (1994).

Murthy, S. et al., "Randomized induction of oblique decision trees," *Proceedings of the Eleventh National Conference on Artificial Intelligence*, AAI Press/MIT Press, pp. 322–327 (1993.

"Other Web Sites for Data Mining and Knowledge Discovery," http://kdnuggets.com/websites.html, pp. 1–3, Last updated: Sep. 10, 1997.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1, pp. 81–106 (1986).

Rendell, L. and Seshu, R., "Learning hard concepts through constructive induction: framework and rationale," *Computational Intelligence*, vol. 6, No. 4, pp. 247–270 (Nov. 1990).

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference*, Morgan Kaufmann Publishers, Inc., pp. 259–265 (1994.

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html., pp. 1–2, Last updated: Oct. 31, 1997.

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," *Proceedings of the Seventh National Conference on Artificial Intelligence*, Morgan Kaufmann, vol. 2, pp. 601–606 (Aug. 1988).

Weiss, S.M. and Kulikowski, C.A., *Computer Systems That Learn: Classification and Prediction Methods from Statistics, Neural Nets, Machine Learnings, and Expert Systems*, Morgan Kaufmann Publishers, Inc., entire book, (1991).

MineSet User's Guide, Silicon Graphics Computer Systems, 1996, made available to public less than one year prior to Jan. 13, 1997.

Greenwood, J., "Countdown to the Cybermarket," Financial Post Magazine, Mar. 1994, pp. 26–32.

Boyl, J. et al., "Design of a 3D user interface to a database," submitted to Database Issues for Data Visualization Workshop, Jul., 1993, pp. 1–9.

Gershon, N. et al., "Visualization's New Tack: Making Sense of Information," IEEE Spectrum, Nov., 1995, pp. 38–47 and 55.

"Mineset Awards," http://www.sgi.com/Products/software/MineSet/awards.html, p. 1, (Jan. 9, 1998).

"Silicon Graphics MineSet Wins Bronze Miner Award," http://www.sgi.com/Headlines/1997/October/mineset_release.html, pp. 1–2, (Oct. 1, 1997).

"The 1997 Database Dozen," by D. Stodder, http://www.dbpd.com/96dozen.htm, pp. 1–2, (1996 or 1997).

"A Dozen Companies on the Rise," http://www.dbpd.com/seconddz.htm, pp. 1–9, (Miller Freeman Inc. 1997).

"MineSet 2.0 for Data Mining and Multidimensional Data Analysis," by C. Hall, http:// www.sgi.com/Products/software/MineSet/DMStrategies/, pp. 1–12, (1997). (originally appeared in Sep. 1997 issue of *Data Management Strategies*, Copyright 1997 Cutter Information Corp.)

Ahlberg et al., "IVEE: An Information Visualization & Exploration Environment," Proceedings of Information Visualization '95, 1995, pp. 66–73.

Becker et al., "Smooth Transitions between Bump Rendering Algorithms," *Computer Graphics Proceedings*, Annual Conference Series, 1993, pp. 183–190.

Becker et al., "Unsteady Flow Volumes," *Proceedings of Visualization '95.* pp. 329–335.

Blinn, James F., "Light Reflection Functions for Simulation of Clouds and Dusty Surfaces," *Computer Graphics*, vol. 16, No. 3, Jul. 1982, pp. 116 –124.

Crawfis et al., "Texture Splats for 3D Scalar and Vector Field Visualization," *Proceedings of IEEE Visualization '93*, 1993, pp. 261–265.

Crawfis et al., "Vector Field Visualization," *Computer Graphics and Applications*, vol. 14, pp. 50–56, 1994.

Inselberg et al., "Parallel Coordinates: A Tool for Visualization Multidimensional Geometry," *Proceedings of Visualization '90*, pp. 361–378.

Laur et al., "Hierarchical Splatting: A Progressive Refinement Algorithm for Volume Rendering," *Computer Graphics*, vol. 25, No. 4, Jul. 1991, pp. 285–288.

Levoy, Marc, "Volume Rendering: Display of Surfaces from Volume Data," *IEEE Xomputer Graphics and Applications*, vol. 8, No. 5, May 1988, pp. 29–37.

Martin et al., "High Dimensional Brushing for Interactive Exploration of Multivariate Data," *Proceedings of Visualization '95*, 1995, pp. 271–278.

Max et al., "Bump Shading for Volume Textures," *IEEE Computer Graphics and Applications*, Jul. 1994, 18–20.

Max et al., "Flow Volumes for Interactive Vector Field Visualization," *Proceedings of Visualization '93*, 1993, pp. 19–24.

Sabella, Paolo, "A Rendering Algorithm for Visualizing 3D Scalar Fields," *Computer Graphics*, vol. 22, No. 4, Aug. 1988, pp. 51–58.

Stein et al., "Sorting and Hardware Assisted Rendering for Volume Visualization," *IEEE*, 1995, pp. 83–89.

Van Wijk et al., "HyperSlice," *Proceedings of Visualization '93*. 1993, pp. 119–125.

Westover, Lee, "Footprints Evaluation for Volume Rendering," *Computer Graphics*, vol. 24, No. 4, Aug. 1990, pp. 367–376.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," *IEEE Symposium on Information Visualization*, Oct. 1996, pp. 74–75.

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Beveaux, T., "Virtual Reality Gets Real", *New Media*, (Jan. 1993), pp. 32–35.

Graves, G.L., "NASA's Virtual Reality", *New Media*, (Jan. 1993), pp. 36–38.

Graves, G.L., "Invasion of the Digital Puppets", *New Media*, (Jan. 1993), pp. 38–40.

Yavelow, C., "3–D Sound Found In Space", New Media, (Jan. 1993), pp. 40–41.

Johnson, Brian and Ben Shneiderman, "Tree–Maps: A Space Filling Approach to the Visualization of Hierarchical Information Structures", *IEEE Visualization Proceedings '91*, Oct. 1991, pp. 284–291.

Structural Dynamics Research Corporation News Release, "SDRC Announces Software Translator Between CADAM and I–DEAS", Mar. 31, 1992.

Jacobson, Bob, "The Ultimate User Interface", *BYTE*, Apr. 1992, pp. 175–182.

Clarkson, Mark A., "An Easier Interface",*BYTE* , Feb. 1991, pp. 277–282.

Radding, Alan, "PC GIS: Expect Gain but Also Some Pain", *Computerworld*, Feb. 17, 1992, p. 89.

Hilderbrand, Carol, "GIS Vital In Utility's Duel with Competitor ", *Computerworld*, Jan. 20, 1992, p. 43.

Anthes, G.H., "GIS Eases Redistricting Worry", *Computerworld*, Oct. 7, 1991, p. 65.

Alexander, Michael, "GIS Sprouting Corporate Wings", *Computerworld*, Jul. 22, 1991, p. 20.

Wilder, C., "Virtual Reality Seeks Practicality", *Computerworld 26 (17)*, Apr. 27, 1992, p. 26.

Fairchild, Kim M., Steven E. Poltrock and George W. Furnas, "SemNet: Three–Dimensional Graphic Representations of Large Knowledge Bases", *Cognitive Science and its Applications for Human–Computer Interaction* , Guindon, Ed., 1988, pp. 201–233.

*Precision Visuals International Limited* , "Summary of PV–WAVE Point & Click Visual Data Analysis Software", 1991.

Flanagan, William G., "Cyberspace Meets Wall Street", *Forbes*, Jun. 22, 1992, pp. 164–168.

Grinstein, G. et al., "Visualization for Knowledge Discovery", *Intl. J. Intelligent Systems 7*, 1992, pp. 637–648.

Fuller, J.E., Using Autocad, 3d Ed., Chapter 17, *Viewing 3–D Drawings*, 1989, pp. 17–1–17–14, and Tutorial, pp. 19–15–19–16, Delmar Publishers, Inc., Albany, NY 12212.

Alexander, M., "Visualizing Cleared–Off Desktops", *Computerworld 25 (18)*, May 6, 1991, p. 20.

Benedikt, M., ed., *Cyberspace First Steps*, The MIT Press, Cambridge, Massachusetts (1992), pp. 1–436.

Forrest, D., "Seeing Data In New Ways", *Computerworld*, Jun. 29, 1992, pp. 85–86.

Newquist, H.P., "Virtual Reality's Commercial Reality", *Computerworld 26 (3)*, pp. 93–95; 1992.

"News: What's New—Business Software", *BYTE*, Mar. 1992, p. 78.

News Release, Company: Information Builders, Dateline: Pacific Palisades, CA, "Remarkable 3D Main–Frame Graphics Available for PC Users", Feb. 1985.

News Release, Company: Information Builders, Inc., Dateline: Palm Desert, CA, "Information Builders Announces Release 3.0 of PC/Focus DBMS", Jun. 1, 1987.

News Release, Company: Honeywell Bull, Dateline: Bilerica, MA "Relational Software System Increases Integration, Productivity for Honeywell Bull Users", Jul. 17, 1987.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Virtus Corporation, Dateline: Cary, NC. "Virtus Walkthrough Releases Quicktime Component", Nov. 1, 1991.

News Release, Company: Alias Research, Dateline: Toronto, Ontario, "Alias Ships Sketch!, Freeform 3D Illustration and Design Program", Nov. 15, 1991.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

Foley et al., "Computer Graphics: Principals and Practice", Second Edition, Addison–Wesley Publishing Co., 1990, pp. 731–734 and color plate III.23.

GAUSSIAN TEXTURE 700

METHOD, SYSTEM, AND COMPUTER PROGRAM FOR VISUALLY APPROXIMATING SCATTERED DATA

BACKGROUND OF THE INVENTION

1. Field of the Invention

The present invention relates to visualizing scattered data points using a computer display.

2. Related Art

Computer visualization tools are called upon to handle ever increasing amounts of data. Conventional scatter plots visually represent multivariate data points as graphical glyphs plotted along one, two, or three axes. Each data point has one or more data attributes, also called variables. These data attributes can be numerical or categorical. Each axis can represent a different data attribute. Additional data attributes can be represented by varying the color or size of the glyphs.

Problems are encountered in visualizing scattered data when the number of data points is large. In general, each data point in a conventional scatter plot is represented by a corresponding glyph. As the number of scattered data points increases, more glyphs crowd a scatter plot display. The time it takes to render each glyph increases. The time it takes to build and display a scatter plot can become too long, thereby, precluding interactive, on-the-fly rendering of scattered data. Occlusion can also occur as data points in the foreground of a scatter plot hide data points behind them. A serious problem occurs when many data points occupy the same location.

To illustrate the above problem, consider a two-dimensional scatter plot containing millions of data points. It takes a very long time for a graphics processor to draw millions of glyphs covering all these data points. If each data point is represented by a single pixel on the screen, then there will be many overlapping data points. Only the data point for a glyph which is drawn last for a given pixel location will be seen.

The same problems occur in three-dimensional scatter plots where three-dimensional (3-D) glyphs (e.g., cubes, spheres, etc.) are used to represent data points. These 3-D glyphs are plotted with respect to three scatter plot axes. Rendering such a 3-D scatter plot for large numbers of data points can take a long time, as many glyphs must be processed. Moreover, if there are many data points to be covered, glyphs in the foreground occlude those in the back. Also, data is hidden when the data points are clustered together. There is no easy way to examine data inside a cluster.

What is needed is a data visualization tool that visually approximates a scatter plot when a large number of data points needs to be drawn.

SUMMARY OF THE INVENTION

The present invention provides a method, system, and computer program product for visually approximating a scatter plot. Through a binning process, bins of scattered data points are formed. Each axis of a scatter plot is discretized according to a binning resolution. Bin positions along each discretized scatter plot axis are determined from bin numbers.

According to the present invention, the bins, which represent a cloud of scattered data points, are volume rendered as splats. The opacity of each splat is a function of the number (count) of data points in a corresponding bin. The color of the splat is based on one or more data attributes associated with the data points in a corresponding bin. The data attribute(s) which is mapped to splat color can be an external data attribute(s) not represented by any scatter plot axis.

In one embodiment, the opacity of a splat at its center is determined by the following equation:

opacity=$1-\exp^{(-u^*count)}$, where count is the number of scattered data points in a corresponding bin, u is a global scale factor, and exp denotes an exponential function. A slider can be provided to vary u so that the overall opacity of a scatter plot image is altered. The color of the splat is a function of an aggregate value (e.g. an average value) of an external data attribute associated with the scattered data points. Splats are preferably rendered in a back to front (or front to back) order, that is, sorted based on distance from the eye point.

The present invention allows arbitrarily large numbers of scattered data points to be rendered quickly. Speed depends upon resolution of the binning not the number of data points. A splat plot is attained which visually approximates a cluster of data points in a scatter plot. The opacity of a splat visually represents the density of data points in a corresponding bin. For uniform bins, the density can be determined based on the number (count) of data points in a corresponding bin. The color of the splat visually represents a data attribute associated with the data points in a corresponding bin. Nearby composited splats overlap producing a smooth volume image in a splat plot.

According to a further feature of the present invention, a dragger object is displayed that permits a user to select different regions inside a splat plot. Information about selected regions can then be displayed.

Further features and advantages of the present invention, as well as the structure and operation of various embodiments of the present invention, are described in detail below with reference to the accompanying drawings.

BRIEF DESCRIPTION OF THE DRAWINGS

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Terminology

Figure 1:
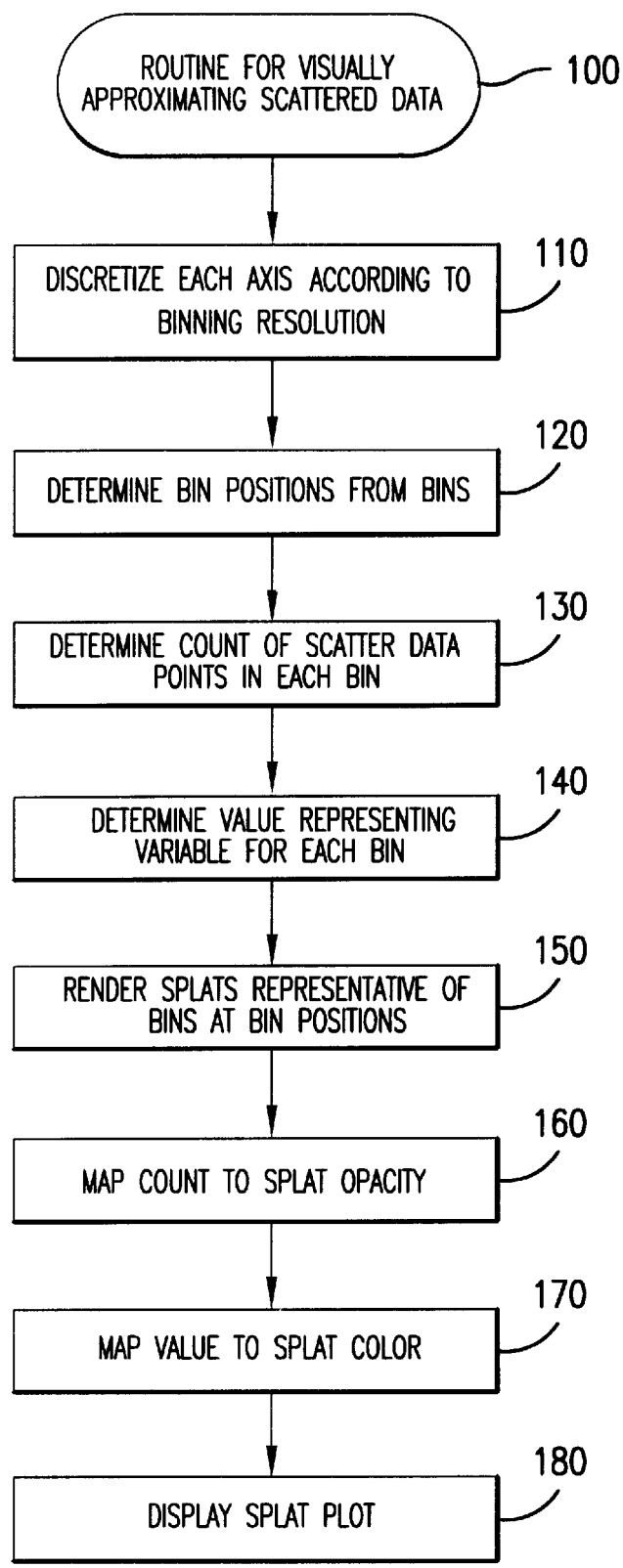
FIG. 1 is a flowchart showing a routine for visually approximating scattered data according to the present invention.

The present invention provides a new data visualization tool that visually approximates a scatter plot. Bins, representing clouds of scattered data points, are volume rendered as splats. The opacity of each splat is a function of the density of data points (e.g. the count or number of data points) in a corresponding bin. The color of the splat represents a data attribute associated with the data points in a corresponding bin.

The following terms are used to describe the present invention:

"Data," "data points," "scattered data," "multivariate data," and equivalents thereof, are used interchangeably to refer to a data set having corresponding data attributes (also called variables) that are suitable for a multivariate data visualization, such as, a scatter plot. One data point can contain multiple data attributes. Data attributes are represented as numerical or categorical variables in each axis of a scatter plot. Numerical variables can include any type of numerical value or range (e.g. real numbers or integers). Categorical variables have nominal values like text strings. For example, a data attribute representing color can include the following categorical variable values: "red," "blue," and "orange." Numerical values can also be assigned to each categorical variable value for sorting and other operations (i.e. "red" can be set to 1, "blue" can be set to 2, and "orange" can be set to 3).

A 1-D scatter plot has one axis plotting one variable. A 2-D scatter plot has two axes plotting two variables. A 3-D scatter plot has three axes plotting three variables. Any type of data can be used, including but not limited to, business, engineering, science, and other applications. Data sets can be received as data records, flat files, relational or non-relational database files, direct user inputs, or any other data form.

"Binning" refers to any conventional process for aggregating scattered data points into bins. Bins can be made up of uniform and/or non-uniform clusters of data points.

"Splat" (also called a footprint) refers to any transparent shape used to build a transparent volume. For example, splats, when composited in a back to front order relative to an eye point (or a front to back order), can be used to reconstruct transparent volumes.

Splats used in the present invention can include, but are not limited to, Gaussian splats. A Gaussian splat is one that is most opaque at its center and approaches zero opacity, according to a Gaussian function in every radial direction. A Gaussian splat is typically approximated with a collection Gouraud shaded triangles, or more accurately, as a texture mapped polygon (e.g. rectangle).

Splats used in the present invention can also include, but are not limited to, the examples of splats described in the following articles (each of which is incorporated by reference herein): L. Westover, "Footprint Evaluation for Volume Rendering", Proceedings of SIGGRAPH '90, Vol 24 No 4, pp 367–376; Lauer and Hanrahan, "Hierarchial Splatting: A Progressive Refinement Algorithm for Volume Rendering," *Computer Graphics,* vol. 25, No. 4, July 1991, pp. 285–289; and Crawfis and Max, "Texture Splats for 3D Scalar and Vector Field Visualization", Proceedings of Visualization 1993, p 261–265. For instance, a splat can be drawn as a collection of Gouraud shaded triangles (see, e.g., the Lauer and Hanrahan 1991 article), or as texture mapped rectangles (see, e.g., the Crawfis and Max 1993 article).

Figure 7B:
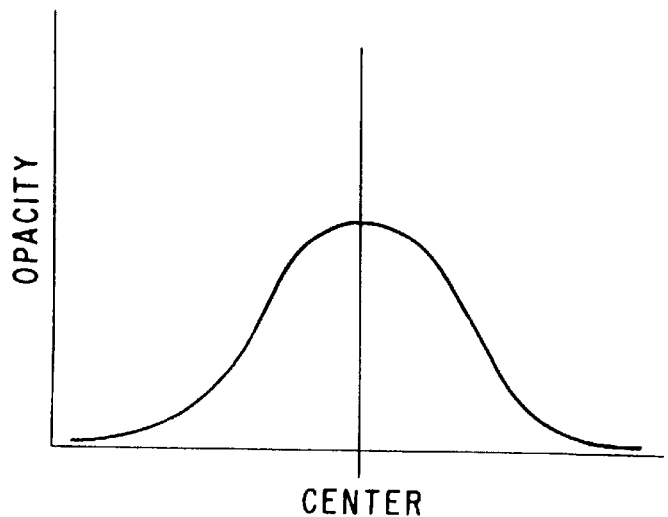
FIG. 7B is a graph of the opacity of the Gaussian texture in FIG. 7A.
Figure 7A:
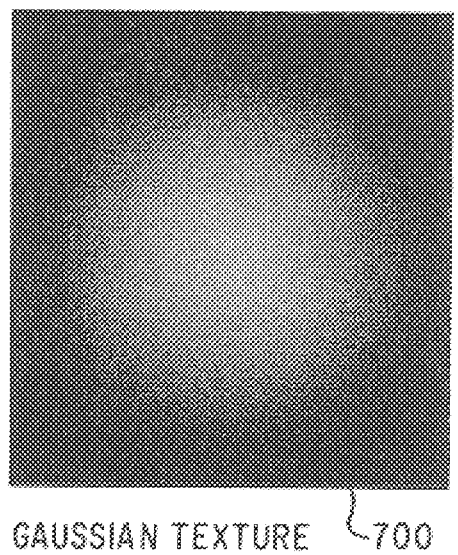
FIG. 7A is an image of an example Gaussian texture that can be texture mapped by a graphics engine to form a textured splat according to the present invention.

FIG. 7A shows an example of a Gaussian texture 700 that can be texture mapped by a graphics engine to form a textured splat. FIG. 7B is a graph of the opacity of Gaussian texture 700 illustrating the variation in opacity from a peak at the center to zero according to a Gaussian function.

2. Example Environment

The present invention is described in terms of an example computer graphics and data mining environment. Given the description herein, it would be obvious to one skilled in the art to implement the present invention in any general computer including, but not limited to, a computer graphics processor (single chip or multiple chips), high-end to low-end graphics workstations, virtual machine (e.g. Java-created application), and network architectures (e.g., client/server, local, intermediate or wide area networks). In one preferred example, the present invention can be implemented as software, firmware, and/or hardware in a data mining tool, such as, the Mineset product released by Silicon Graphics, Inc., and executed on a graphics workstation manufactured by Silicon Graphics, Inc. (e.g., an Indigo$^2$, Indy, Onyx, or O$_2$ workstation). A further example computer system is described below with respect to FIG. 5, but is not intended to limit the present invention.

Description in these terms is provided for convenience only. It is not intended that the invention be limited to application in this example environment. In fact, after reading the following description, it will become apparent to a person skilled in the relevant art how to implement the invention in alternative environments.

3. Visually Approximating Scattered Data

FIG. 1 shows a routine 100 for visually approximating scattered data according to the present invention. For clarity, the steps of routine 100 will be described in general terms and with reference to a specific example. The specific example uses a sample ore data set of data records related to ore samples extracted from a mining site, as shown in the table below:

TABLE 1

| Sample Ore Data Set | | | |
|---|---|---|---|
| Longitude (x) | Latitude (y) | Depth (z) | Value (color) |
| 6586.435 | 21866.457 | 9849.911 | 0.01 |
| 6585.729 | 21866.958 | 9850.411 | 0.01 |
| 6585.023 | 21867.459 | 9850.911 | 0.01 |
| 6584.317 | 21867.961 | 9851.411 | 0.02 |
| ⋮ | | | |
| 6568.526 | 22281.813 | 10028.994 | 2.35 |
| 6628.461 | 22281.813 | 10090.753 | 0.14 |
| 6650.017 | 22281.834 | 10094.368 | 0.02 |
| 6631.844 | 22281.848 | 10152.818 | 0.03 |
| 6599.928 | 22281.867 | 10067.001 | 0.05 |
| (8191 rows) | | | |

Each data record has four attributes (longitude, latitude, depth, and value) characterizing each ore sample. The first three attributes represent the x,y,z location (longitude, latitude, depth) of an ore sample within the mining site. The fourth attribute (value) gives an indication of the quality of the ore in the sample taken at that location. These four attributes are illustrative. Each data record can have many additional attributes.

A. Binning

In step 110, each scatter axis variable is discretized according to a binning resolution to form bins. In general, any conventional binning technique (uniform or non-uniform) can be used to bin numeric (i.e. real-valued) attributes and categorical attributes. If a categorical attribute is mapped to an axis then the binning is defined to be the distinct values of that attribute, or some grouping of these values based on metadata.

Preferably, uniform bins are created for each variable (or data attribute) that is mapped to a scatter axis. Non-uniform bins can also be formed. In one simple example, each axis of a scatter plot can be discretized into k bins, where k is a positive integer. In a 2-D case, $k_1 * k_2$ bins (or "buckets") are available for aggregating data points on two respective discretized axes. In a 3-D case, $k_1 * k_2 * k_3$ bins are available for aggregating data points on three respective discretized axes. Binning is performed as part of pre-processing to reduce processing during rendering.

Bin positions are then determined from the bins (step 120). Bin positions define the order of bins along each discretized axis and can be determined from bin numbers associated with the bins. For a numeric attribute, the bin numbers are determined from the discretized real-values, that is, sorting the bins based on the discretized real-values and determining corresponding bin positions. For a categorical attribute, the bin numbers are determined from the distinct values of that attribute. The order of bins (and corresponding bin positions) along a discretized axis can be determined by sorting the distinct categorical values in any number of different ways. For example, sorting methods can include, but are not limited to, sorting based on alphabetical or numeric order, sorting based on count, or sorting based on an aggregate value (e.g. average) of the attribute mapped to color.

A count of the number of scattered data points aggregated into each bin is determined (step 130). An aggregate value that represents a data attribute of the scattered data points in a bin is determined for each bin as well (step 140). The aggregate value in one preferred example is an average value of a data attribute of scatter data points in a bin. The aggregate value can also be a minimum, maximum, median, count, or any other value representing a data attribute of scatter data points in a bin.

The aggregate value can represent an external variable not mapped to an axis or a data variable that is mapped to an axis. There could be multiple value columns in Tables 1 and/or 2, each value column representing a different data attribute. In the splat plot visualization as described below, it is a simple matter to select among the value columns for purposes of mapping the color without doing any additional computation.

A data structure can be created to store bin position, count, and value data for each bin as determined in steps 120 to 140, respectively. For example, a new table having records corresponding to bins and data attributes representative of the bins (e.g. bin position, count, and value of an external attribute) can be created. An example new binned table drawn from the sample ore data set of Table 1 for three-dimensions (longitude, latitude, and depth) is shown below:

TABLE 2

Binned Sample Ore Data Set

| Longitude-Bin | Latitude-Bin | Depth-Bin | Value | Count |
|---|---|---|---|---|
| 0 | 15 | 17 | 0.02 | 6 |
| 0 | 21 | 12 | 0.02 | 3 |
| 1 | 20 | 0 | 0.02 | 1 |
| 1 | 21 | 12 | 0.0225 | 4 |
| 2 | 14 | 17 | 0.0266 | 3 |
| 2 | 15 | 17 | 0.01 | 1 |
| 2 | 20 | 0 | 0.027 | 7 |
| : | : | : | : | : |
| : | : | : | : | : |
| 42 | 49 | 37 | 0.03 | 3 |
| 43 | 48 | 36 | 0.04 | 1 |
| 49 | 49 | 36 | 0.01 | 1 |
| (1743 rows) | | | | |

The binning resolution here is arbitrarily chosen to be k=50 making rendering about ten times faster than a scatter plot using all of the data points. A two-dimension example would only need two bin position data attributes (e.g., any two of longitude, latitude, or depth). One-dimension example would only need one bin position data attribute (e.g., longitude, latitude, or depth).

B. Rendering Splats

Next, in step 150, splats representative of the bins are rendered in a graphics engine. A splat is drawn at each bin location to form an image that visually approximates an original scatter plot of the data. Splats are rendered in a back-to-front order (or front-to-back order) during compositing such that splats located furthest from a display screen are rendered before splats located closer to a display screen.

For each bin, the count of scattered data points aggregated in the bin is mapped to a splat opacity (step 160). In one example, a graphics engine texture maps the opacity value across a polygon to represent a splat.

In one preferred embodiment, the splat opacity is a function of the count of aggregated data points in a corresponding bin as determined by the following equation:

$$opacity = 1 - exp(-u * count),$$

where, opacity represents the opacity value of a splat at its center, count represents the count of aggregated data points in a corresponding bin, u represents a global scale factor, and exp denotes an exponential function (such as, an exponential function having a natural logarithm base e). The above exponential opacity function is effective in modeling light propagation through clouds of light emitting spheres.

A slider or other controller can be used to vary the value of the global scale factor u. This allows globally scaling of the opacity for each splat to make an entire display image of rendered splats more or less transparent. This scaling by the global scale factor, while impacting the entire image, is not linear. A splat's opacity is scaled differently depending upon its count, that is, the number of data points the splat represents.

Figure 6:
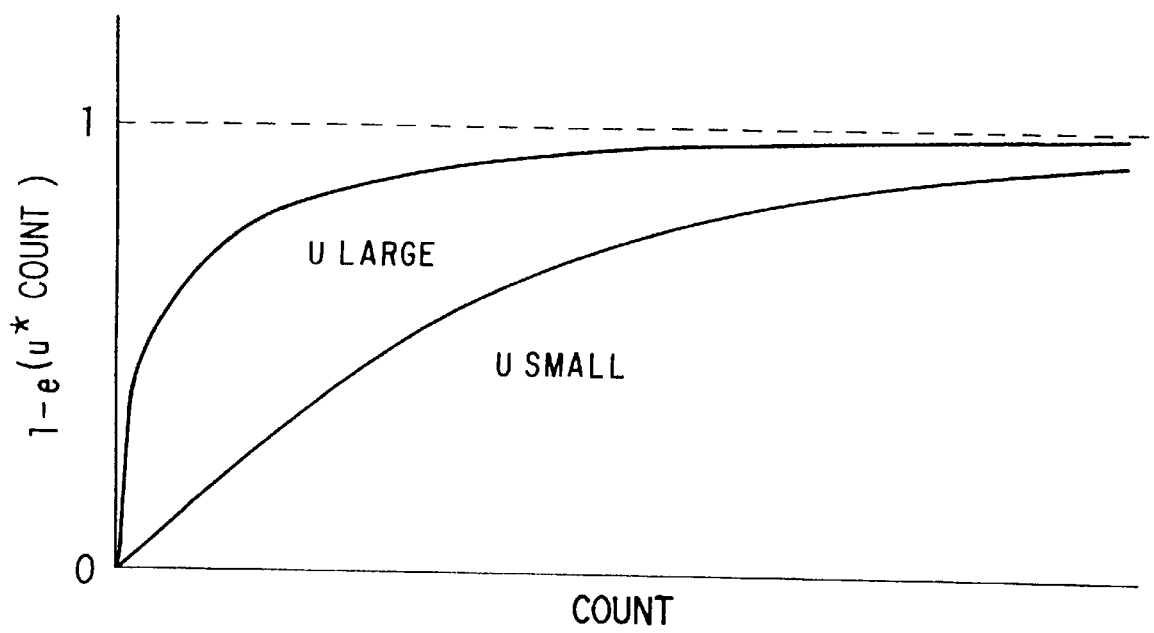
FIG. 6 is a graph showing an opacity function used in the present invention for large and small global scale factors.

FIG. 6 is a graph showing the above opacity function using large and small global scale factors. In particular, the opacity value for a splat is an exponential function of the count of the scattered data points that approaches an asymptotic limit 1 for large counts. The global scale factor is set to a value (i.e. large or small) for a particular image. As shown in FIG. 6, when a large global scale factor is used, each splat's opacity approaches the asymptotic limit 1 more quickly (for lower counts) than a small global scale factor.

In step 170, the value representative of a variable associated with the aggregated data points in a respective bin determined in step 140, is mapped to a color value. For example, a color transfer function can be used to map an average value of a numeric external variable for each bin. Each splat is then rendered with a color value that is a function of the external variable associated with the aggregated data points in a respective bin.

Finally, the splats are composited to form a volume rendered image on a display screen (step 180). The image includes the rendered splats with opacity and color determined according to steps 150–170. The splats are plotted along discretized scatter axes at bin positions determined in step 120. In this way, the volume rendered image is a splat plot that visually approximates the scattered data points.

Figure 2:
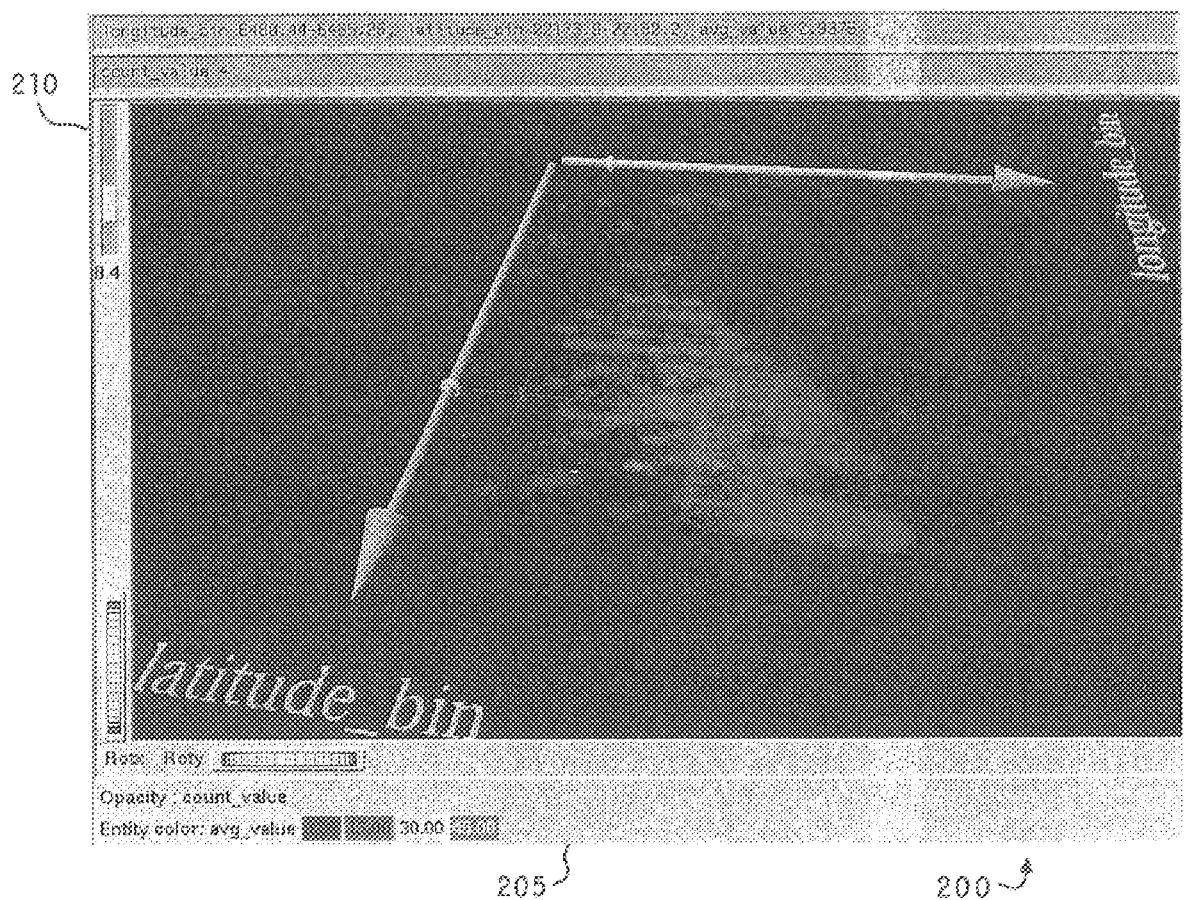
FIG. 2 is an example color image of a two-dimensional splat plot that uses splats to visually approximate scattered data according to the present invention.

FIG. 2 shows an example color image of a two-dimensional splat plot 200 that uses splats to visually approximate scattered data according to the present invention. Splat plot 200 was generated using the sample data described above with respect to Tables 1 and 2.

A display window 205 includes a slider 210 and two thumb wheels Rotx, Roty for manipulating the orientation of the two-dimensional splat scatter plot 200. Slider 210 globally alters the opacity of splats in the two-dimensional splat scatter plot 200. Thumbwheels Rotx and Roty rotate the image about horizontal and vertical axes respectively. Other controls (not shown) for manipulating the plot 200 such as, magnifying, reducing, or shifting the image can be used. Finally, a legend is provided to show what the opacity and color of the splats represent (e.g. opacity represents a count value and color represents an average value, 0–15 is mapped to blue, 15–30 is mapped to green, 30–45 is mapped to yellow, and 45 and above is mapped to red).

Figure 3:
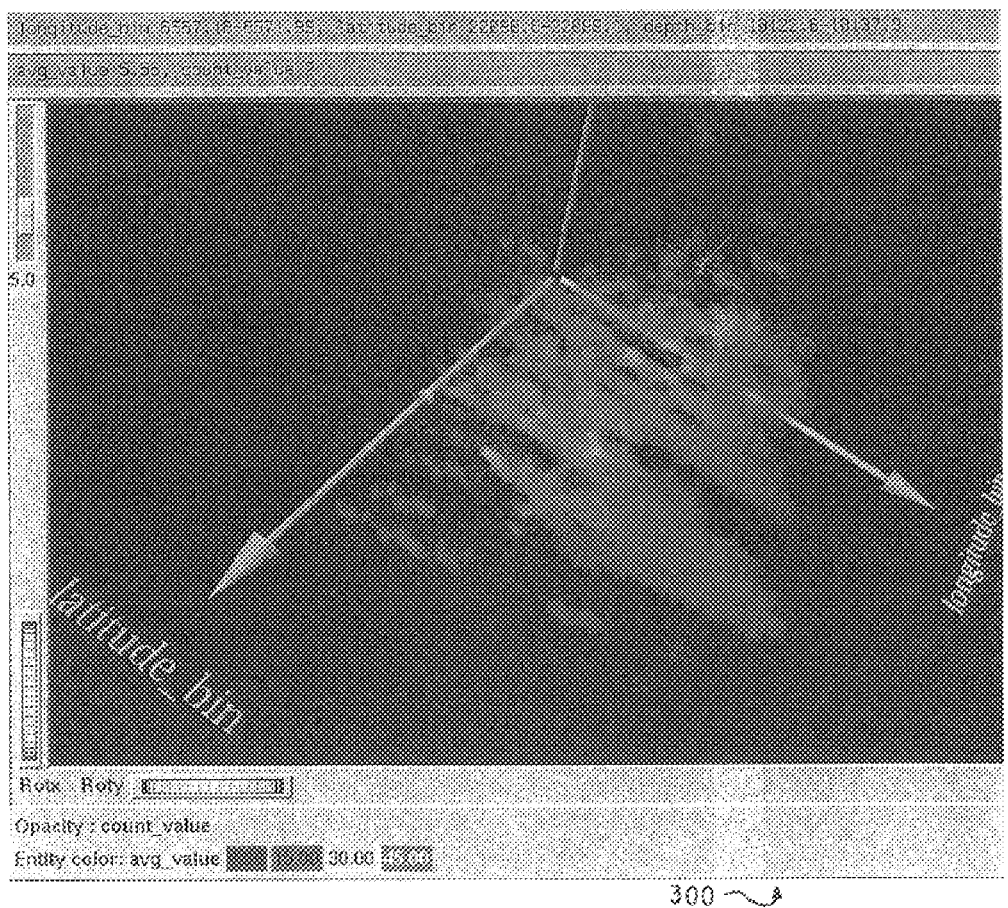
FIG. 3 is an example color image of a three-dimensional splat plot that uses splats to visually approximate scattered data according to the present invention.
Figure 4:
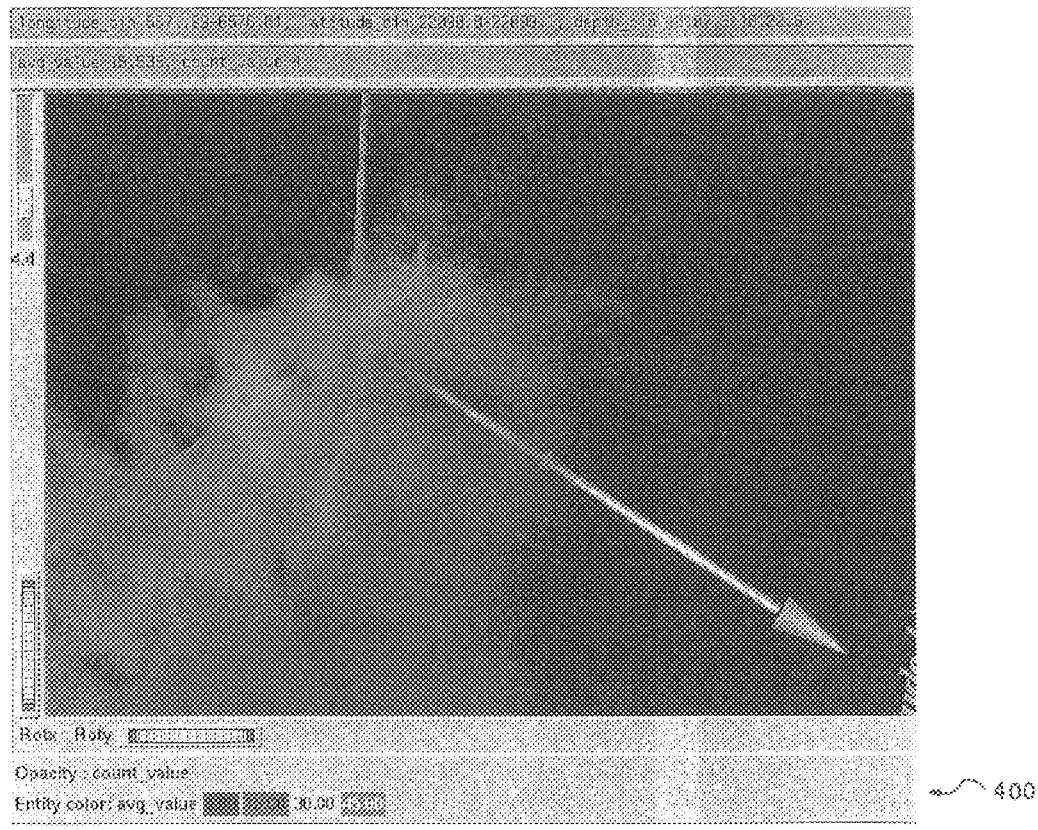
FIG. 4 is a close-up view of the color image of FIG. 3 further showing textured splats.

FIG. 3 shows an example color image of a three-dimensional splat plot 300 that uses splats to visually approximate scattered data according to the present invention. Splat plot 300 was generated using the sample data described above with respect to Tables 1 and 2. FIG. 4 shows a close-up view 400 of the color image of FIG. 3 which further shows an example of textured splats.

According to a further feature of the present invention, a dragger object is displayed to permit a user to select different regions inside the splat plot 400. The dragger object is shown in this example as a relatively opaque cylinder having reference axes that are parallel to the displayed scatter axes. The dragger object can be manipulated by a user through a mouse or other user-interface control.

Information about a selected region at which the dragger object is located can then be displayed. This information can include the values of the data attributes of the bin at or nearest to the selected region. See, e.g., the top window 450 in FIG. 4 which shows information on interior binned data points at the location of the dragger object, namely, longitude 6571.99–6576.81, latitude 22090.8–22099.1, depth bin 10107.3–10122.6. By moving and selecting different regions using the dragger object, a user can navigate inside a volume rendered image. By reading window 450 a user can scan information on interior binned regions.

According to another embodiment of the present invention, volume rendering involving ray tracing or cell projection can be used to represent bins of aggregated data points. For ray tracing, volumes (e.g. polygons) are rendered by using bin centers as vertices. The bin positions containing no data are assumed to have zero density (completely transparent). At bin positions where data is present, the density is directly proportional to the count of scattered data points. See, e.g., the use of ray tracing in volume rendering in the reprinted article by Levoy, "Display of Surfaces from Volume Data," *IEEE Computer Graphics and Applications,* vol. 8, No. 5, May 1988, pp. 29–37 (reprinted pages 135–43) (incorporated herein by reference).

For cell projection, cubes are constructed by using bin centers as vertices. Again, if a bin with no data is needed as a vertex to complete a cube, that vertex will have an opacity equal to zero. The opacity assigned to the vertices is then a function of the count of scattered data points in a corresponding bin, according to the following equation:

$$\text{opacity} = 1 - \exp(-u^* \text{count}),$$

where, opacity represents the opacity value of a cube, count represents said count of data points in a corresponding bin, u represents a global scale factor, and exp denotes an exponential function. The transparent cubes are rendered directly or by using tetrahedral decomposition in a back to front order. See, e.g., the use of cell projection in volume rendering in the articles by Wilhelms and Van Gelder, "A Coherent Projection Approach for Direct Volume Rendering," *Computer Graphics,* vol. 25, No. 4, July 1991, pp. 275–284 (incorporated herein by reference) and Stein et al., "Sorting and Hardware Assisted Rendering for Volume Visualization," IEEE 1995, pages 83–89 (incorporated herein by reference).

4. Example GUI Computer Environment

Figure 5:
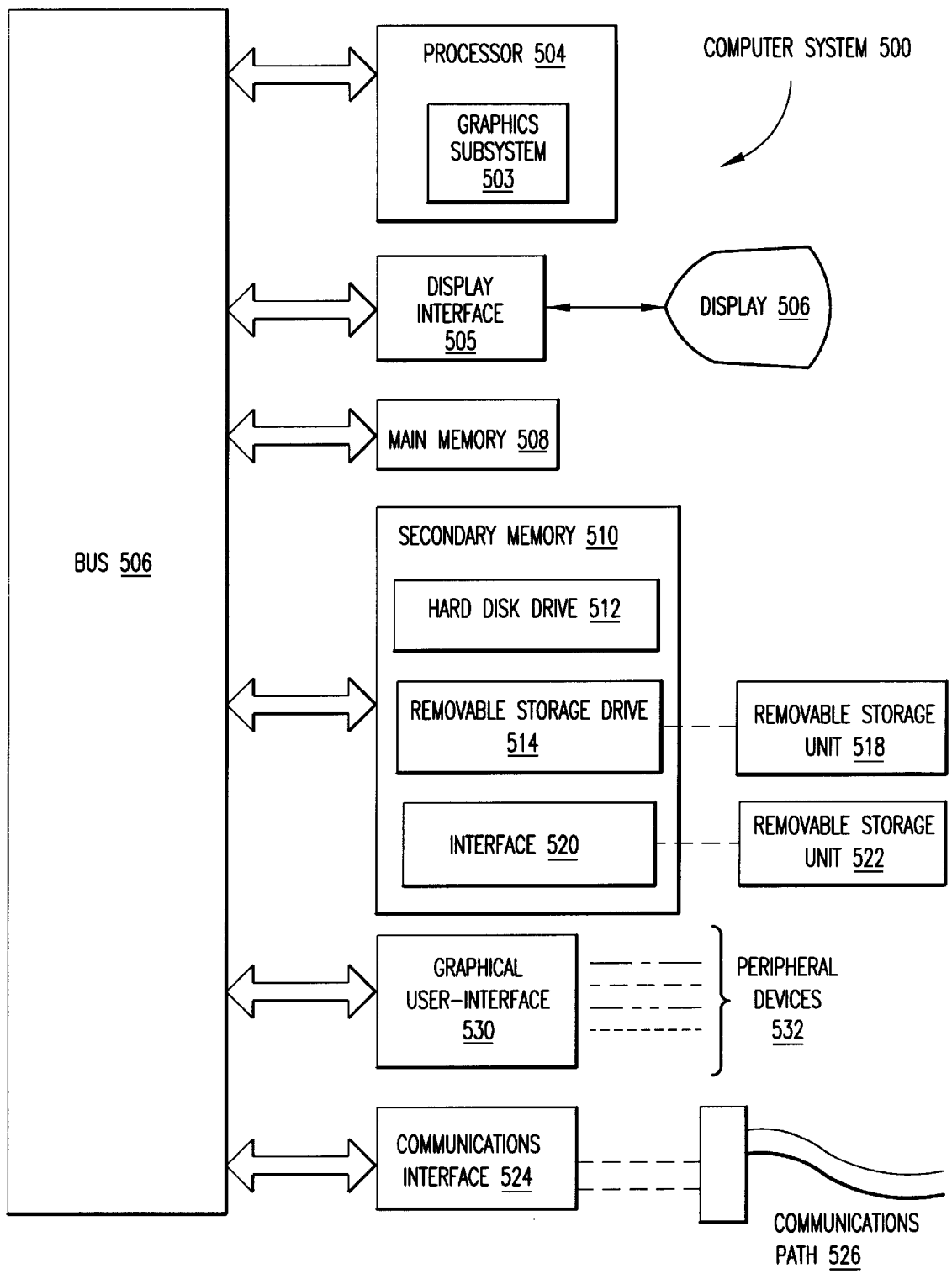
FIG. 5 shows an example graphics computer system for executing the routine of FIG. 1.

FIG. 5 is a block diagram illustrating an example environment in which the present invention can operate. The environment is a computer system 500 that includes one or more processors, such as processor 504. Computer system 500 can include any type of general computer.

The processor 504 is connected to a communications bus 506. Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 500 includes a graphics subsystem 503. Graphics subsystem 503 can be implemented as one or more processor chips. The graphics subsystem 503 can be included as part of processor 504 as shown in FIG. 5 or as a separate graphics engine or processor. Graphics data is output from the graphics subsystem 503 to the bus 506. Display interface 505 forwards graphics data from the bus 506 for display on the display unit 506.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc., which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices via communications path 526. Examples of communications interface 524 can include a modem, a network interface (such as Ethernet card), a communications port, etc. Software and data transferred via communications interface 524 are in the form of signals which can be electronic, electromagnetic, optical or other signals capable of being received by communications interface 524, via communications path 526. Note that communications interface 524 provides a means by which computer system 500 can interface to a network such as the Internet.

Graphical user interface module 530 transfers user inputs from peripheral devices 532 to bus 506. These peripheral devices 532 can be a mouse, keyboard, touch screen, microphone, joystick, stylus, light pen, or any other type of peripheral unit. These peripheral devices 532 enable a user to operate and control the data visualization tool of the present invention as described above.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 5. In this document, the term "computer program product" is used to generally refer to removable storage unit 518 or a hard disk installed in hard disk drive 512. These computer program products are means for providing software to computer system 500.

Computer programs (also called computer control logic) are stored in main memory and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512, or communications interface 524. Alternatively, the computer program product may be downloaded to computer system 500 over communications path 526. The control logic (software), when executed by the processor 504, causes the processor 504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

5. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for visually approximating a scatter plot of data points, comprising the steps of:
    binning the data points into bins;
    determining a bin position for each bin;
    determining a count of data points in each bin; and
    rendering splats at bin positions of corresponding bins, each splat having an opacity that is a function of said count of data points in a corresponding bin, whereby, a splat plot can be displayed that visually approximates the scatter plot of data points.

2. The method of claim 1, further comprising the step of:
    globally scaling the opacity of each splat.

3. The method of claim 1, wherein said rendering step renders each splat having an opacity that is a function of said count of data points in a corresponding bin, according to the following equation:

$$\text{opacity} = 1 - \exp(-u * \text{count}),$$

where, opacity represent the opacity value of a splat at approximately a splat center, count represents said count of data points in a corresponding bin, u represents a global scale factor, and exp denotes an exponential function.

4. The method of claim 1, further comprising the steps of:
    for each bin, determining an aggregate value of a variable associated with said data points in a respective bin; wherein said rendering step renders each splat with a respective color that is a function of said aggregate value determined for a corresponding bin.

5. The method of claim 1, wherein said rendering step composites splats in a back-to-front order such that splats located farthest from a display screen are rendered before splats located closer to a display screen.

6. The method of claim 1, wherein each bin position has at least one position coordinate, each position coordinate corresponds to an axis in the scatter plot.

7. The method of claim 1, wherein said binning step comprises:
    discretizing each variable to be plotted along a respective axis in a splat plot according to a binning resolution.

8. The method of claim 1, wherein each bin position includes two position coordinates corresponding to two respective variables associated with the data points, and further comprising the step of:
    displaying a two-dimensional splat plot that includes said rendered splats located at respective bin positions along two axes in said two-dimensional splat plot.

9. The method of claim 1, wherein each bin position includes three position coordinates corresponding to three respective variables associated with the data points, and further comprising the step of:
    displaying a three-dimensional splat plot that includes said rendered splats located at respective bin positions along three axes in said three-dimensional splat plot.

10. The method of claim 1, wherein said rendering step texture maps said opacity across a polygon to represent a splat.

11. The method of claim 1, further comprising the steps of:
displaying a splat plot that includes said rendered splats;
displaying a dragger object;
permitting a user to select a region in the splat plot by moving said dragger object to said region; and
displaying information about said region; whereby information on regions inside a volume rendered splat plot can be read.

12. A system for visually approximating a scatter plot of data points, comprising:
means for binning the data points into bins;
means for determining a bin position for each bin;
means for determining a count of data points in each bin; and
means for rendering splats at bin positions of corresponding bins, each splat having an opacity that is a function of said count of data points in a corresponding bin, whereby, a splat plot can be displayed that visually approximates the scatter plot of data points.

13. The system of claim 12, further comprising:
means for globally scaling the opacity of each splat.

14. The system of claim 12, wherein said rendering means renders each splat having an opacity that is a function of said count of data points in a corresponding bin, according to the following equation:

$$opacity = 1 - exp(-u * count),$$

where, opacity represents the opacity value of a splat at an approximate splat center, count represents said count of aggregated data points in a corresponding bin, u represents a global scale factor, and exp denotes an exponential function.

15. The system of claim 12, further comprising:
means for determining an aggregate value of a variable associated with said data points in a respective bin; wherein said rendering means renders each splat with a respective color that is a function of said aggregate value determined for a corresponding bin.

16. The system of claim 12, wherein said rendering means composites splats in a back-to-front order such that splats located furthest from a display screen are rendered before splats located closer to a display screen.

17. The system of claim 12, wherein each bin position has at least one position coordinate, each position coordinate corresponds to an axis in the scatter plot.

18. The system of claim 12, wherein said means for binning comprises:
means for discretizing each variable to be plotted along a respective axis in the splat plot according to a binning resolution.

19. The system of claim 12, wherein each bin position includes two position coordinates corresponding to two respective variables associated with the data points, and further comprising:
means for displaying a two-dimensional splat plot that includes said rendered splats located at respective bin positions along two axes in said two-dimensional splat plot.

20. The system of claim 12, wherein each bin position includes three position coordinates corresponding to three respective variables associated with the data points, and further comprising:
means for displaying a three-dimensional splat plot that includes said rendered splats located at respective bin positions along three axes in said three-dimensional splat plot.

21. The system of claim 12, wherein said rendering means comprises means for texture mapping said opacity across a polygon to represent a respective splat.

22. The system of claim 12, further comprising:
means for displaying a splat plot that includes said rendered splats;
means for displaying a dragger object;
means for permitting a user to select a region in the splat plot by moving said dragger object to said region; and
means for displaying information about said region; whereby information on regions inside a volume rendered splat plot can be read.

23. A computer program product comprising a computer useable medium having computer program logic recorded thereon for enabling a graphics processor in a computer system to visually approximate a scatter plot of data points, said computer program logic comprising:
means for enabling the graphics processor to bin the data points into bins;
means for enabling the graphics processor to determine a bin position for each bin;
means for enabling the graphics processor to determine a count of data points in each bin; and
means for enabling the graphics processor to render splats at bin locations of corresponding bins, each splat having an opacity that is a function of said count of data points in a corresponding bin, whereby, a splat plot can be displayed that visually approximates the scatter plot of data points.

24. A method for visually approximating a scatter plot of data points, comprising the steps of:
binning the data points into bins;
determining a bin position for each bin; and
volume rendering at bin positions of corresponding bins.

25. The method of claim 24, wherein said volume rendering step includes ray tracing.

26. The method of claim 24, wherein said volume rendering step includes cell projection.

* * * * *

UNITED STATES PATENT AND TRADEMARK OFFICE
CERTIFICATE OF CORRECTION

PATENT NO. : 5,861,891

DATED : January 19, 1999

INVENTOR : Barry Glenn Becker

It is certified that an error appears in the above-identified patent and that said Letters Patent is hereby corrected as shown below.

In Item: [54] on the cover page, insert --PRODUCT-- directly after "PROGRAM".

In column 1, line 2, insert --PRODUCT-- directly after "PROGRAM".

In section [56] on the cover page, replace "4,994,247" with --4,994,989--.

Signed and Sealed this

Sixth Day of March, 2001

Attest:

NICHOLAS P. GODICI

Attesting Officer

Acting Director of the United States Patent and Trademark Office